United States Patent
Griffin

(10) Patent No.: US 6,637,287 B2
(45) Date of Patent: Oct. 28, 2003

(54) OPERATOR HANDLE WITH OVERTORQUE PROTECTION

(75) Inventor: Christopher Griffin, Groton, CT (US)

(73) Assignee: Roto Frank of America, Inc., Essex, CT (US)

( * ) Notice: Subject to any disclaimer, the term of this patent is extended or adjusted under 35 U.S.C. 154(b) by 24 days.

(21) Appl. No.: 09/991,783

(22) Filed: Nov. 14, 2001

(65) Prior Publication Data

US 2003/0089190 A1 May 15, 2003

(51) Int. Cl.[7] .................................................. G05G 1/00
(52) U.S. Cl. ............................................. 74/545; 403/2
(58) Field of Search ........................... 74/543, 545, 548; 403/2

(56) References Cited

U.S. PATENT DOCUMENTS

| | | | | |
|---|---|---|---|---|
| 3,707,885 A | * | 1/1973 | Profet | 74/524 |
| 3,830,119 A | * | 8/1974 | Travis | 81/477 |
| 3,921,471 A | * | 11/1975 | Smith | 74/523 |
| 4,550,581 A | * | 11/1985 | Best et al. | 70/422 |
| 5,201,241 A | * | 4/1993 | Pollack, Jr. | 74/528 |
| 5,301,389 A | * | 4/1994 | Engel et al. | 16/422 |
| 5,544,675 A | * | 8/1996 | Dean | 137/797 |
| 5,787,744 A | * | 8/1998 | Berger et al. | 70/422 |
| 6,237,894 B1 | * | 5/2001 | Cotner et al. | 254/1 |
| 6,439,078 B1 | * | 8/2002 | Schlude et al. | 74/527 |
| 2002/0124468 A1 | * | 9/2002 | Manzella | 49/336 |

FOREIGN PATENT DOCUMENTS

JP        10-280797   * 10/1998   ............ E05F/11/10

* cited by examiner

Primary Examiner—Thomas R. Hannon
Assistant Examiner—Vicky A. Johnson
(74) Attorney, Agent, or Firm—Marshall, Gerstein & Borun LLP

(57) ABSTRACT

A handle is provided for an operator that provides overtorque protection for the operator. The handle includes a hand grip connected to a connecting shaft, which is mateably received in the operator. The connecting shaft includes at least one weakened section which breaks or fractures in the event an excessive amount of torque or force is applied to the handle. As a result, the handle breaks when the user applies an excessive amount of torque to the handle in an effort to open or close the structure connected to the operator. The broken handle may be easily replaced by removing the broken section of the connecting shaft from the operator and replacing the handle by inserting the new handle with a new connecting shaft into the operator. The gear mechanism disposed within the escutcheon of the operator is protected from the excessive amount of torque or force and, accordingly, the handle is intended to break before the operator which avoids the need for replacing the entire operator.

6 Claims, 1 Drawing Sheet

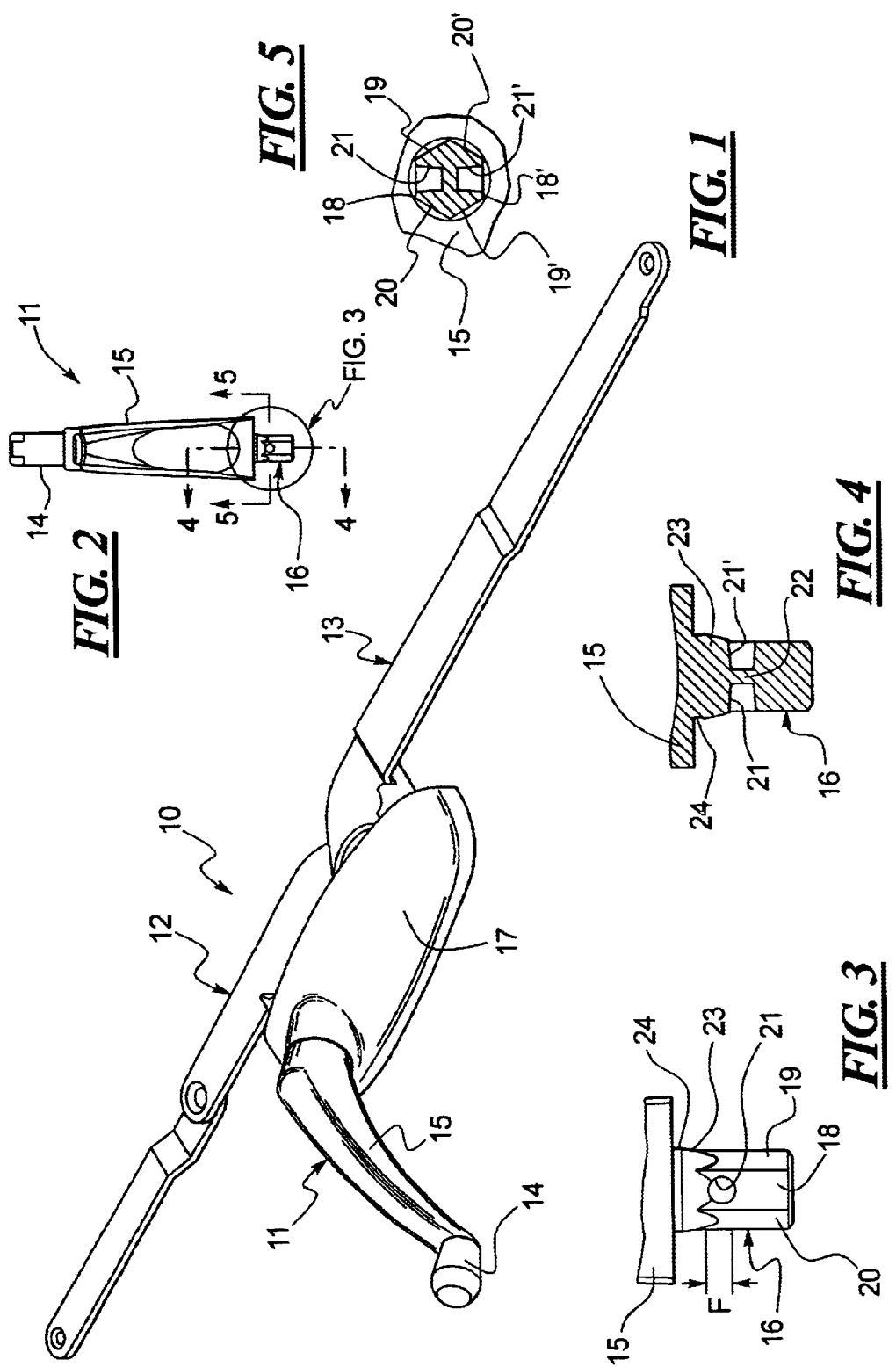

OPERATOR HANDLE WITH OVERTORQUE PROTECTION

TECHNICAL FIELD

An improved operator handle is disclosed that is applicable to all types of windows and other applications where a cranking rotation of a handle is transmitted to one or more arms for purposes of opening and closing a structure, such as a window, hatch or door. More specifically, an operator handle is disclosed which is designed to fail in the event an excessive amount of torque is applied to the handle. Failure of the handle prevents breakage or damage to the operator which transmits the rotational movement of the handle to one or more moving arms. As a result, the handle can be easily replaced without the need for a replacing the more expensive operator.

BACKGROUND

Casement windows, louvre windows, some roof windows and a variety of doors and hatches employ a crank mechanism whereby the user cranks or rotates a handle connected to an operator. The operator, in turn, translates the rotational movement of the handle into a rotational or pivotal movement of one or more arms which results in the opening or closing of the window, door, hatch or other structure. The handles typically include a hand grip connected to a downwardly extending connecting shaft. The connecting shaft typically has a non-circular cross section such as a square or hexagon. The shaped connecting shaft is mateably received in the operator.

A typical operator design includes a worm gear with a shaped hole for receiving the connecting shaft of the handle. The worm gear is enmeshed with another gear which either directly or indirectly imparts a rotational movement to one or more arms which opens or closes the structure.

A problem arises with these conventional designs when the user applies too much force or torque to the handle. Specifically, if the window, door, latch or structure is locked and the user is unaware that the structure is locked, the user will often apply too much torque to the handle in an attempt to open the structure which can result in the worm gear being damaged or the gear enmeshed with the worm gear being damaged. Damage to the internal gears of the operator requires replacement of the operator and, often, replacement of the connecting arm or arms as well. Removal of the existing operator and installation of a new operator is a relatively time consuming and complicated procedure.

Such overtorquing by the user can also occur if the structure being opened is somehow stuck or jammed due to warping of the structure. Specifically, wooden casement window frames are prone to warping. As a result, they may not shut properly which makes it very difficult to lock the window. The user is inclined to apply too much torque or force to the handle in an attempt to shut the window completely so that the user can lock the window. This action can result in a damaged operator, which will need to be replaced. Similarly, if a window, door, hatch or other movable structure is closed for an extended period of time, it can often become stuck in the closed position due to swelling of the movable structure caused by high humidity or a bonding between the paint on the movable structure and the paint on the surrounding frame caused by moisture or heat. As a result, the user can be tempted to dislodge the movable structure by applying an excessive amount of torque to the operator handle thereby resulting in damage to the operator.

As a result, there is a need for an improved operator design with overtorque protection. In other words, there is a need for an improved operator design which effectively prevents damage to the internal components of the operator caused by an excessive amount of force applied to the handle by the user.

SUMMARY OF THE DISCLOSURE

In satisfaction of the aforenoted need, an improved handle for an operator used to translate rotational movement of the handle to at least one connecting arm is disclosed. The handle is designed to break in the event the user applies an excessive amount of torque to the handle. The improved handle comprises a hand grip connected to a connecting shaft. The connecting shaft is mateably engaged to the operator. The connecting shaft comprises at least one weakened portion that provides a failure section in the connecting shaft. The failure section is designed to break in the event an excessive amount of torque is applied to the handle. As a result, the handle breaks, instead of any of the internal gear components of the operator. The handle may then be easily replaced without the need to replace the operator.

In a refinement of the above concept, the weakened portion of the connecting shaft comprises at least one hole or recess that extends at least partially through the connecting shaft. The hole or recess causes the connecting shaft to break in the event an excessive amount of torque is applied to the handle.

In a further refinement, the at least one hole or recess comprises two diametrically opposed holes or recesses that extend at least partially through the connecting shaft.

Thus, if the connecting shaft has a hexagonal cross section, the holes or recesses are disposed in diametrically opposed surfaces of the hexagonal connecting shaft. The connecting shaft then breaks along the line that extends transversely through the connecting shaft and the holes or recesses. After the connecting shaft fails or breaks, a portion of the broken connecting shaft remains in the operator. However, the holes or recesses provide slots or a space which enables the user to obtain a grip or purchase on the broken connecting shaft so that it can be easily removed from the operator. Then, a new handle may be simply inserted into the operator.

As noted above, the weakened portion of the connecting shaft may comprise one or more holes or recesses which reduce the effective cross-sectional area of the connecting shaft in this weakened portion. The one or more holes or recesses may be in the form of one or more holes that extend into the connecting shaft transversely of the central axis of the connecting shaft. Similarly, slots or recesses may extend into the connecting shaft transversely of the connecting shaft axis. It is also anticipated that a center hole aligned with the axis of the connecting shaft would also sufficiently weaken the connecting shaft to provide a failure section. If one or more holes or recesses are employed, they need not be diametrically opposed from one another but a diametrically opposed configuration of two holes, recesses or slots is preferred.

A method for protecting an operator from being overtorqued is also disclosed. The method comprises providing a handle designed to fail when too much torque or force is applied to the handle. The handle comprises a hand grip connected to a connecting shaft. The connecting shaft comprises a non-circular cross section with at least one hole or recess extending at least partially through the connecting shaft to weaken the connecting shaft. The connecting shaft is then mateably inserted into a shaped hole of the operator.

An improved casement window operator is also provided which comprises a handle comprising a hand grip connected to a connecting shaft. The connecting shaft comprises a non-circular cross section. The connecting shaft further comprises at least one hole or recess extending at least partially through the connecting shaft to weaken the connecting shaft. The operator comprises a noncircular hole for mateably receiving the connecting shaft of the handle.

BRIEF DESCRIPTION OF THE DRAWINGS

FIG. 1 is a perspective view of an operator equipped with a handle designed to fail in the event too much force or torque is applied to the handle;

FIG. 2 is a front plan view of the handle shown in FIG. 1;

FIG. 3 is an enlarged front plan view of the detail 3 of FIG. 2, particularly illustrating the connecting shaft of the handle;

FIG. 4 is a sectional view taken substantially along line 4—4 of FIG. 2; and

FIG. 5 is another sectional view taken substantially along line 5—5 of FIG. 2.

DETAILED DESCRIPTION OF THE PRESENTLY PREFERRED EMBODIMENTS

FIG. 1 is a perspective view of an operator 10 used to open and close casement windows. The operator 10 translates rotational movement applied to the handle 11 to the arms 12, 13, which, in turn, results in an opening or closing of a casement window. It will be noted that while the handle 11 is shown in connection with an operator 10 used to open and close casement windows, the handle 11 can be used with a variety of operators used to open and close louvre windows, roof windows, pivoting windows, doors, hatches, roof vents and other structures which are opened and closed with a cranking handle connected to an operator. Thus, the disclosed handle 11 is not limited to use with a casement window operator such as the operator 10.

In the embodiment illustrated in FIG. 1, the handle 11 includes a hand grip 14 connected to a handle section 15 which, in turn, is connected to a connecting shaft 16 (see FIGS. 2–5). The connecting shaft 16 is mateably received into a bushing, worm gear other structure incorporating a non-circular hole that is disposed within the escutcheon 17 of the operator 10. The reader will also note that while the operator 10 employs two arms 12, 13, the disclosed handle 11 can be used with operators that utilize a single arm as well.

As discussed above, operators, like the operator 10, employ one or more gears disposed within the escutcheon 17 which translate rotational movement imparted to the handle 11 to the arms 12, 13. To avoid damage to the gear systems disposed within the escutcheon 17, the handle 11 is designed to fail in the event an excessive amount of torque or force is applied to the handle 11. As a result, the handle 11 provides overtorque protection for the operator 10.

Turning to FIG. 2, the handle 11 includes a connecting shaft connected to the hand grip 14 by way of the handle section 15. As shown in FIGS. 3 and 5, the connecting shaft 16 preferably comprises a non-circular cross-section so that it may be received in a non-circular hole disposed in the operator escutcheon 17 without the need for a connecting pin or lock screw. In the embodiment illustrated in FIGS. 2–5, the connecting shaft 16 has a hexagonal cross-section with diametrically opposed sides, 18, 18', 19, 19', 20, 20'.

The sides 18, 18' include opposing holes or recesses 21, 21'. The holes or recesses 21, 21' reduce the effective cross-sectional area of the connecting shaft 16 along a longitudinal section F of the shaft 16. As a result, this longitudinal section F provides a failure section for the connecting shaft 16. When an excessive amount of force or torque is applied to the handle 11, the shaft 16 breaks along the section F before damage or breakage is imposed on the internal working parts of the operator 10.

As shown in FIG. 5, when the shaft is broken along the section F (FIG. 3), portions of the holes or recesses 21, 21' will still be visible to the user looking into the operator 10 and the broken portion of the shaft 16 that remains in the operator 10 may be easily removed with a pair of tweezers or a screwdriver as the holes 21, 21' will enable the user to obtain a grip or purchase on the broken portion of the shaft 16 that remains in the operator 10. The broken portion of the shaft 16 may then be easily removed and the entire handle 11 easily replaced.

The holes or recesses 21, 21' may be provided in a variety of forms which will be apparent to those skilled in the art. In FIGS. 2–5, the holes 21, 21' extend inward towards a central axis of the connecting shaft 16 and are diametrically opposed to one another, extending through the opposing faces 18, 18' of the connecting shaft 16. However, one or more slots could be disposed in the connecting shaft 16 which would provide the same benefit. Thus, two opposing holes or recesses 21, 21' are not necessary, and a single hole, recess or slot would also prove sufficient. All that is required is that the effective cross-sectional area of the connecting shaft 16 be reduced to thereby cause the connecting shaft 16 to fail in the event an excessive amount of force or torque is applied to the handle 11.

In the event two holes or recesses 21, 21' are utilized, it is preferred that these holes or recesses 21, 21' are diametrically opposed to one another thereby leaving a centrally located remaining portion 22 of the shaft disposed along the central longitudinal axis of the shaft 16. However, the configuration illustrated in FIG. 4 is not necessary. Again, all that is required is that the effective cross-sectional area of the remaining shaft portion 16 along the failure section F be reduced to ensure that the shaft 16 fails before any gears or working components inside the escutcheon 17 of the operator 10 are damaged.

In the embodiment illustrated in FIGS. 2–4, the connecting shaft 16 includes an upper enlarged portion 23 and a circumferential slot 24. This structure enables the connecting shaft 16 to be snap fitted into the escutcheon 17 which would include a resilient washer, o-ring or flange which slides over the enlarged portion 23 and snaps into place in the circumferential recess 24 when the handle 11 is installed in the operator 10.

The handle 11 may be cast as a unitary structure. One suitable material for casting the handle 11 is zinc. Other suitable materials include zinc alloys, aluminum, aluminum alloys and other materials easily cast molded that will be apparent to those skilled in the art.

While only one preferred embodiment has been disclosed, other embodiments incorporating the principles disclosed herein will be apparent to those skilled in the art. Accordingly, the above description is not intended to be limiting and it is anticipated that variations will be apparent to those skilled in the art that do not depart from the scope and spirit of the disclosure as set forth in the appended claims.

What is claimed:

1. A handle for a window operator, the handle comprising:
   a hand grip,
   a handle section having a first end and a second end,
   a connecting shaft comprising an upper end having enlarged frusto-conically shape and a lower end having a flat bottom surface and a hexagonal cross section, the connecting shaft further comprising a middle section extending between the upper and lower ends with two pairs of flat opposing sides and one pair of opposing sides each comprising an oppositely directed hole, the oppositely directed holes extending through an outer surface of the connecting shaft and terminating short of the other of said oppositely directed holes,
   the hand grip being rotatably connected to the first end of the handle section,
   the second end of the handle section being integrally connected to the second end of the connecting shaft,
   the handle section being continuously arched as it extends from the hand grip to the connecting shaft.

2. The handle of claim 1, wherein the handle section and connecting shaft are die cast as a unitary part.

3. The handle of claim 2 wherein the handle section and connecting shaft are die cast from zinc.

4. The handle of claim 2 wherein the handle section and connecting shaft are die cast from a zinc alloy.

5. A method for protecting a casement window operator from being overtorqued, the method comprising:
   providing a handle for the operator, the handle comprising
      a hand grip,
      a handle section having a first end and a second end,
      a connecting shaft comprising an upper end having enlarged frusto-conically shape and a lower end having a flat bottom surface and a hexagonal cross section, the connecting shaft further comprising a middle section extending between the upper and lower ends with two pairs of flat opposing sides and one pair of opposing sides each comprising an oppositely directed hole, the oppositely directed holes extending through an outer surface of the connecting shaft and terminating short of the other of said oppositely directed holes,
      the hand grip being rotatably connected to the first end of the handle section,
      the second end of the handle section being integrally connected to the second end of the connecting shaft, and
      the handle section being continuously arched as it extends from the hand grip to the connecting shaft;
   mateably inserting the connecting shaft into a hexagonally shaped hole of an operator.

6. A casement window operator comprising:
   a handle comprising
      a hand grip,
      a handle section having a first end and a second end,
      a connecting shaft comprising an upper end having enlarged frusto-conically shape and a lower end having a flat bottom surface and a hexagonal cross section, the connecting shaft further comprising a middle section extending between the upper and lower ends with two pairs of flat opposing sides and one pair of opposing sides each comprising an oppositely directed hole, the oppositely directed holes extending through an outer surface of the connecting shaft and terminating short of the other of said oppositely directed holes,
      the hand grip being rotatably connected to the first end of the handle section,
      the second end of the handle section being integrally connected to the second end of the connecting shaft, and
   an operator mechanism comprising a hexagonal hole for mateably receiving the connecting shaft of the handle.

* * * * *